United States Patent
Gao et al.

(10) Patent No.: US 10,437,485 B2
(45) Date of Patent: Oct. 8, 2019

(54) MANAGING STORAGE ARRAY CONFIGURATION

(71) Applicant: EMC IP Holding Company LLC, Hopkinton, MA (US)

(72) Inventors: Jian Gao, Beijing (CN); Hongpo Gao, Beijing (CN); Jamin Jianbin Kang, Beijing (CN); Geng Han, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 286 days.

(21) Appl. No.: 15/180,438

(22) Filed: Jun. 13, 2016

(65) Prior Publication Data
US 2016/0378376 A1 Dec. 29, 2016

(30) Foreign Application Priority Data
Jun. 24, 2015 (CN) .......................... 2015 1 0353440

(51) Int. Cl.
*G06F 3/06* (2006.01)
*G06F 11/20* (2006.01)

(52) U.S. Cl.
CPC .......... *G06F 3/0619* (2013.01); *G06F 3/0604* (2013.01); *G06F 3/0629* (2013.01); *G06F 3/0632* (2013.01); *G06F 3/0644* (2013.01); *G06F 3/0665* (2013.01); *G06F 3/0689* (2013.01); *G06F 11/2058* (2013.01)

(58) Field of Classification Search
CPC .... G06F 3/0619; G06F 3/0689; G06F 3/0665; G06F 3/0629
See application file for complete search history.

(56) References Cited

U.S. PATENT DOCUMENTS

| | | | |
|---|---|---|---|
| 6,496,914 B1 * | 12/2002 | Vook | G06F 3/0604 709/220 |
| 6,725,331 B1 * | 4/2004 | Kedem | G06F 11/2094 711/112 |
| 8,131,743 B1 | 3/2012 | Joyce et al. | |
| 8,856,079 B1 | 10/2014 | Subramanian et al. | |
| 9,792,056 B1 * | 10/2017 | Gao | G06F 3/0689 |
| 9,983,896 B1 | 5/2018 | Naik et al. | |
| 10,146,456 B1 | 12/2018 | Gao et al. | |
| 10,146,646 B1 | 12/2018 | Foley et al. | |
| 10,180,790 B1 | 1/2019 | Taylor et al. | |
| 10,229,022 B1 | 3/2019 | Gao et al. | |
| 2004/0066699 A1 * | 4/2004 | Nabekura | G06F 3/0607 365/232 |

(Continued)

FOREIGN PATENT DOCUMENTS

| CN | 103392166 | 11/2013 |
|---|---|---|
| CN | 104216660 | 12/2014 |

*Primary Examiner* — Nathan Sadler
(74) *Attorney, Agent, or Firm* — BainwoodHuang (57) ABSTRACT

Embodiments of the present disclosure provide a method and a device of managing storage array configuration by storing a basic configuration information of a user drive onto a system drive; storing an extended configuration information of the user drive onto the user drive, and in response to a change of the storage array, creating a new disk array group or updating a disk array group according to the basic configuration information and the extended configuration information.

18 Claims, 5 Drawing Sheets

(56) References Cited

U.S. PATENT DOCUMENTS

| | | | |
|---|---|---|---|
| 2004/0221102 A1* | 11/2004 | Watanabe | G06F 3/0611 |
| | | | 711/112 |
| 2012/0278584 A1* | 11/2012 | Nagami | G06F 3/0607 |
| | | | 711/170 |
| 2014/0136777 A1 | 5/2014 | Davis et al. | |

* cited by examiner

MANAGING STORAGE ARRAY CONFIGURATION

RELATED APPLICATION

This application claim priority from Chinese Patent Application Number CN201510353440.X, filed on Jun. 24, 2015 at the State Intellectual Property Office, China, titled "METHOD AND DEVICE OF MANAGING STORAGE ARRAY CONFIGURATION," the contents of which is herein incorporated by reference in entirety.

Disclaimer

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure relate to a storage array.

BACKGROUND OF THE INVENTION

Generally, in an existing storage array, a storage array may be generally divided into system drives and user drives. Usually, some disk array (also known as independent disk redundant array, RAID) groups and logical unit numbers (LUNs) and raw disk space may be consumed by the system itself. For example, an operating system (OS) image may be stored on the raw disk space. In addition, metadata (i.e., configuration information) of internal objects (e.g., a drive, a RAID group, a LUN) of a user drive may be also stored on system drives.

SUMMARY OF THE INVENTION

Embodiments of the present disclosure are intended to provide a method and a device of managing storage array configuration to overcome the above-identified shortcomings One embodiment includes a method of managing storage array configuration by storing basic configuration information of a user drive onto a system drive; storing extended configuration information of the user drive onto the user drive, and in response to a change of the storage array, creating a new RAID group or updating a RAID group according to the basic configuration information and the extended configuration information.

BRIEF DESCRIPTION OF THE DRAWINGS

Figures illustrated herein are provided to help further understanding of the present disclosure, which constitute a part of the present application, and the illustrative embodiments of the present disclosure and the illustration thereof are used to illustrate the present disclosure. In the figures.

DETAILED DESCRIPTION

In the following, references are made to the exemplary embodiments illustrated in the accompanying drawings to describe the principle and spirit of the present disclosure. It should be understood that description of these embodiments is only for enabling those skilled in the art to better understand and implement the present disclosure, rather than limiting the scope of the present disclosure in any manner.

References in the specification to "one embodiment", "an embodiment", "a preferred embodiment" etc., indicate that the embodiment described may include a particular feature, structure, or characteristic, but every embodiment may not necessarily include the particular feature, structure, or characteristic. Moreover, such phrases are not necessarily referring to the same embodiment. It should also be understood that various terminology used herein is for the purpose of describing particular embodiments only and is not intended to be liming of the disclosure. As used herein, the singular forms "a", "an" and "the" may include the plural forms, unless the context clearly indicates otherwise. It will be further understood that the terms "comprises", "has" and "including" used herein, specify the presence of stated features, elements, and/or components etc., but do not preclude the presence of one or more other features, elements, components and/or combinations thereof. For example, the term "multiple" used here indicates "two or more"; the term "and/or" used here may comprise any or all combinations of one or more of the items listed in parallel.

Definitions of other terms will be specifically provided in the following description. Furthermore, in the following description, some functions or structures well-known to those skilled in the art will be omitted in order not to obscure embodiments of the disclosure in the unnecessary details. The term "drive" herein is not limited to a hard disk drive, but includes any device capable of storing data, such as a solid-state drive, etc. The term "disk array" herein refers to an independent redundant disk array (RAID). Accordingly, the term "disk array group" herein refers to a RAID group. In addition, the term "logical unit" herein is sometimes abbreviated as LUN.

In some embodiments, user drives may be specially used to store user data, but may not be used for storing configuration information. In some other embodiments, a centralized configuration management method may centrally store configuration information of drives on system drives, and may thereby have a number of shortcomings In one embodiment, I/O between user drives and system drives may conflict with a system internal I/O on system drives. In a further embodiment, this conflict may affect user I/O performance dramatically in some cases, such as background services that may be running, and this impact may become bigger as a storage array includes more drives.

In one embodiment, a centralized configuration management method may strictly limit the number of objects like drives, user RAID groups and LUNs, etc., which a storage array may host. In a further embodiment, system RAID groups/LUNs may have a fixed capacity for storing a user RAID group/LUN/drive configuration. In a further embodiment, if a storage array can hold many thousands of drives, RAID groups and LUNs, such configuration management methods simply may not be able hold all configurations for these objects. In an additional embodiment, in a centralized configuration management method, a user RAID group/LUN/data may not be moved across arrays. In an example embodiment, if one RAID group is moved to another array, the new array may not be able to recognize it and may not provide I/O access to this RAID group. In a further embodiment, these moved drives may be erased and used as new ones. In a further embodiment, if a user moves disk drives by mistake, it may result in data being lost.

Embodiments of the present disclosure are intended to provide a method and a device for managing storage array configuration to overcome the above-identified shortcomings. In one embodiment a method of managing storage array configuration may include storing basic configuration information of a user drive onto a system drive. A further embodiment may include storing extended configuration information of a user drive onto a user drive. A further embodiment may include in response to a change of a storage array, creating a new RAID group or updating a RAID group according to a basic configuration information and an extended configuration information.

According to an embodiment the basic configuration information may include: validity information; RAID group identifier information; and LUN identifier information. According to another embodiment, an extended configuration information may include: validity information; RAID group identifier information; drive identifier information; and LUN identifier information.

According to another embodiment, storing extended configuration information of a user drive onto a user drive may include storing an extended configuration information to a RAID group to which a user drive belongs, by using a N-way mirror method; wherein N may be equal to a number of user drives included in a RAID group to which a user drive belongs. According to another embodiment, in response to a change of a storage array, creating a new RAID group or updating a RAID group according to a basic configuration information and an extended configuration information may include identifying drive information on a drive that may be connected to the storage array. A further embodiment may include according to a drive information, determining that a drive belongs to a storage array when a type of a drive is a user drive. A further embodiment may include determining whether extended configuration information on a drive matches basic configuration information on a system drive. A further embodiment may include determining validity of a drive through extended configuration information on a drive and basic configuration information on a system drive, or through extended configuration information on a drive of a RAID group to which a drive belongs. A further embodiment may include based on a creation policy, creating a new RAID group or updating a RAID group according to extended configuration information on a drive.

According to an embodiment, creating a new RAID group or updating a RAID group according to extended configuration information on a drive may include when the storage array comprises other drives of a RAID group to which a drive belongs, adding a drive to a RAID group. According to an embodiment, creating a new RAID group or updating a RAID group based on extended configuration information on a drive may include when a storage array does not comprise other drives of a RAID group to which a drive belongs, creating a new RAID group.

According to an embodiment, in response to a change of a storage array, creating a new RAID group or updating a RAID group according to a basic configuration information and an extended configuration information may include identifying drive information on a drive that may be connected to a storage array. A further embodiment may include according to drive information, determining that a drive does not belong to a storage array when a type of the drive is a user drive. A further embodiment may include when there are at least two drives not belonging to a storage array, creating a new RAID group based on at least two drives according to a basic configuration information and an extended configuration information.

According to an embodiment, creating a new RAID group based on a at least two user drives may include determining validity of drives of at least two user drives which belong to a same RAID group, through extended configuration information of a at least two drives. A further embodiment may include based on a creation policy, creating a new RAID group according to extended configuration information on valid drives of at least two drives which belong to a same RAID group.

According to an embodiment, in response to a change of a storage array, creating a new RAID group or updating a RAID group according to a basic configuration information and an extended configuration information may include identifying drive information on a drive that may be connected to a storage array. A further embodiment may include determining that a drive may not be initialized according to drive information. A further embodiment may include creating a new RAID group or updating a RAID group on a drive based on a creation policy.

According to an embodiment creation policy may include at least of the following: when all drives constituting a RAID group are discovered, creating a RAID group; when a number of undiscovered drives in a RAID group is less than or equal to a predetermined value, creating a RAID group; when at least one drive in a RAID group is discovered, creating a RAID group; and after a predetermined time since one drive in a RAID group is discovered, creating a RAID group.

According to an embodiment drive information may include at least one of initialization information or storage array information. One embodiment may include creating or updating a LUN on a RAID group. One embodiment may include updating basic configuration information on a system drive. A further embodiment may include storing updated basic configuration information to a system drive. A further embodiment may include updating extended configuration information on a RAID group. A further embodiment may include storing updated extended configuration information to drives of a RAID group.

One embodiment includes a device of managing storage array configuration. In a further embodiment, a device may include a basic storage unit configured to store basic configuration information of a user drive onto a system drive. In a further embodiment a device may include an extended storage unit that may be configured to store extended configuration information of a user drive to the user drive. In a further embodiment a device may further include a configuration discovering unit that may be configured to, in response to a change of the storage array, create a new RAID group or update a RAID group according to a basic configuration information and an extended configuration information.

According to an embodiment, the basic configuration information may include validity information; RAID group identifier information; and LUN information. According to an embodiment, extended configuration information may include: validity information; RAID group identifier information; drive identifier information; and LUN identifier information. According to an embodiment, extended storage unit may be further configured to store extended configuration information onto a RAID group to which a user drive belongs, by using a N-way mirror method; wherein N may be equal to a number of user drives included in a RAID group to which a user drive belongs.

According to an embodiment, a configuration discovering unit may be further configured to identify drive information on a drive that may be connected to a storage array. A further embodiment may include according to drive information, determine that a drive belongs to the storage array when a type of the drive is a user drive. A further embodiment may include determining whether extended configuration information on a drive matches basic configuration information on a system drive. A further embodiment may include determining validity of a drive through extended configuration information on a drive and basic configuration information on a system drive, or through extended configuration information on a drive of a RAID group to which a drive belongs. A further embodiment may include based on a creation policy, create a new RAID group or updating a RAID group according to extended configuration information on the drive.

According to an embodiment, creating a new RAID group or updating a RAID group according to extended configuration information on the drive may include when a storage array include other drives of a RAID group to which a drive belongs, adding a drive to a RAID group. According to an embodiment, creating a new RAID group or updating a RAID group based on extended configuration information on a drive may include when a storage array does not include other user drives of a RAID group to which a drive belongs, creating a new RAID group.

According to an embodiment, a configuration discovering unit may be further configured to identify drive information on a drive that may be connected to a storage array. A further embodiment may include, according to drive information, determining that a drive does not belong to a storage array when a type of a drive is a user drive. A further embodiment may include when there are at least two drives not belonging to a storage array, creating a new RAID group based on at least two of the drives according to a basic configuration information and an extended configuration information. According to an embodiment, creating a new RAID group based on at least two of the user drives may include determining validity of drives of at least two drives which belong to a same RAID group, through extended configuration information of at least two drives. A further embodiment may include based on a creation policy, creating a new RAID group according to extended configuration information on valid drives of at least two drives which belong to a same RAID group.

According to an embodiment, a configuration discovering device may be further configured to identify drive information on a drive that may be connected to a storage array. A further embodiment may include determining that a drive is not initialized according to drive information. A further embodiment may include creating a new RAID group or update a RAID group on a drive based on a creation policy.

According to an embodiment, a creation policy may include one of the following: when all drives constituting a RAID group are discovered, creating a RAID group; when a number of undiscovered drives in a RAID group is less than or equal to a predetermined value, creating a RAID group; when at least one drive in a RAID group is discovered, creating a RAID group; and after a predetermined time since one drive in a RAID group is discovered, creating a RAID group.

According to an embodiment, drive information may include at least one of initialization information or storage array information. According to an embodiment a device may further include a logical-unit configuration unit configured to create or update a LUN on a RAID group. According to an embodiment a device may further include a basic updating unit configured to update basic configuration information on a system drive. A further embodiment may include storing updated basic configuration information to a system drive. A further embodiment may include an extended updating unit configured to update extended configuration information in a RAID group. A further embodiment may include storing updated extended configuration information to drives of a RAID group.

One embodiment may include a computer program product that may include program codes, which, when executed on a processor, cause the processor to perform the method disclosed above. Embodiments disclosed herein lessen a conflict between a user I/O and system internal I/O on system drives, eliminate a number limitation on a RAID group, a LUN and a drive caused by a fixed system capacity, and allow a RAID group of a storage array to be movable between the arrays.

Figure 1:
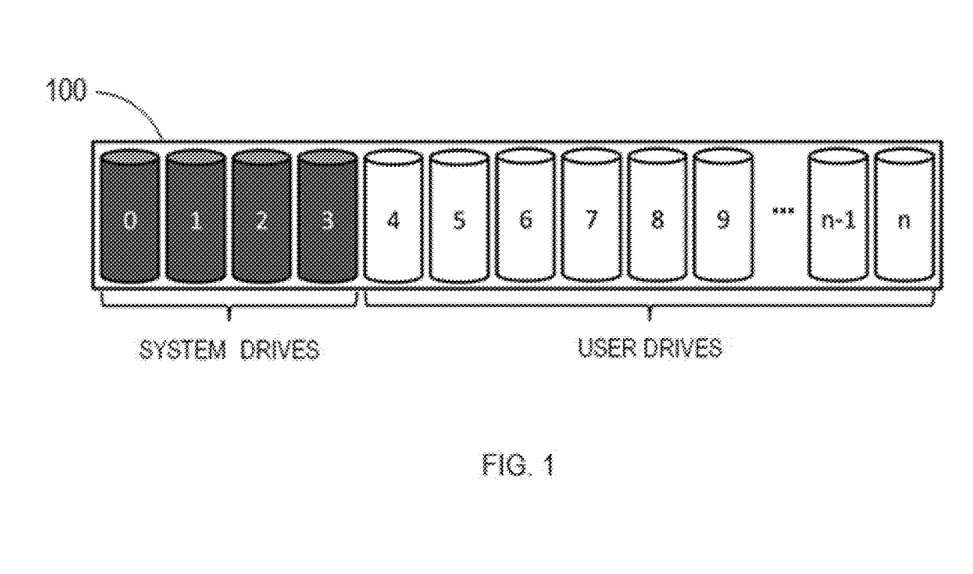
FIG. 1 illustrates a schematic diagram of a storage array according to an embodiment of the present disclosure.

FIG. 1 illustrates a schematic diagram of a storage array 100 according to an embodiment of the present disclosure. Storage array 100 includes system drives and user drives. The system drives may include one or more drives, and the user drives may comprise one or more drives. Moreover, a RAID group of the system drives and a RAID group of the user drives may be created. Further, one or more LUNs can be created in the RAID group.

Figure 2:
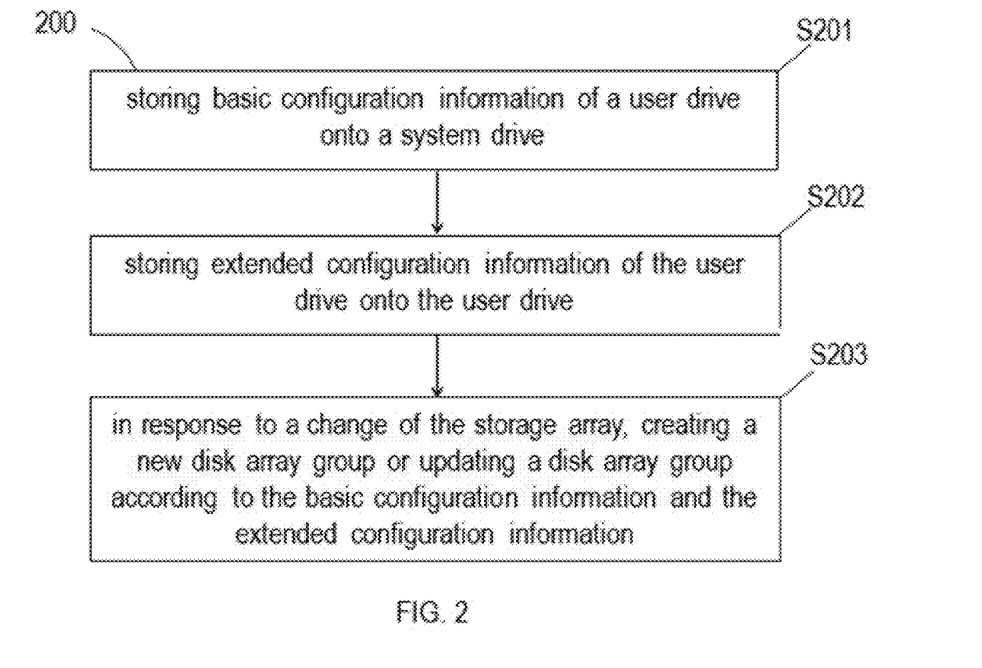
FIG. 2 schematically illustrates a flow chart of a method of managing storage array configuration according to an embodiment of the present disclosure.

FIG. 2 illustrates a flow chart of a method 200 of managing storage array configuration according to an embodiment of the present disclosure. The specific steps of method 200 are described below with reference to FIG. 2. Prior to method 200, a system drive RAID group and a user drive RAID group may be created firstly. Optionally, one or more LUNs may be created in the RAID group. Turn to step S201 after method 200 is started. At step S201, basic configuration information of the user drive(s) is stored onto the system drive(s). According to an embodiment of the present disclosure, the basic configuration information comprises validity information, RAID group identifier information and LUN identifier information. At step S202, extended configuration information of the user drive(s) is stored onto the user drive(s).

According to an embodiment of the present disclosure, the extended configuration information comprises validity information, RAID group identifier information, drive identifier information and LUN identifier information. At step S203, in response to a change of the storage array, creating a new RAID group or updating a RAID group according to the basic configuration information and the extended configuration information.

In one embodiment, validity information may be used to check validity of data, and select a valid data copy from a plurality of mirrors on the system drive. In a further embodiment, a RAID group identifier information and a LUN identifier information may be used to identify the corresponding RAID group and the LUN. In a further embodiment, architecture of basic configuration information according to an embodiment of the present disclosure will be described in detail with reference to FIG. 3.

In one embodiment, similar to validity information in a basic configuration information, a validity information in an extended configuration information may also be used to check validity of data and select a valid data copy from a plurality of mirrors on a user drive. In a further embodiment, RAID group identifier information, a drive identifier information and a LUN identifier information may be used to identify a RAID group, a drive and a LUN. In a further embodiment, architecture of extended configuration information according to an embodiment of the present disclosure will be described in detail with reference to FIG. 4.

According to an embodiment, storing extended configuration information of a user drive onto the user drive may include by an N-way mirror method, storing extended configuration information onto a RAID group to which a user drive belongs; wherein N is equal to a number of user drives contained in a RAID group to which a user drive belongs. In a further embodiment, as the extended configuration information may be stored on each user drive constituting a RAID group in a distributing manner, extended configuration information may be protected in a level equal to or higher than that of a RAID group. In a further embodiment, an N-way mirror method has a highest protection level in all RAID algorithms, and extended configuration information therefore may be stored in accordance with a N-way mirror method. In a further embodiment, N-way mirror method determines which mirror may be valid data by checking validity information in each mirror. In an example embodiment, suppose one drive fails and that a write operation may be performed before a drive may be rebooted to a RAID group to which a drive belongs. In a further embodiment, after reboot, if the drive is still in use, stale data on the drive may be detected by a N-way mirror method and may not be used.

According to an embodiment, in creating a storage array, an alert may be sent in response that at least one of a RAID groups and LUNs of a user drives is not discovered. In a further embodiment, it may be one of the reasons why a basic configuration may be stored on the system drive. In an example embodiment, suppose when a system is just booted, some drives constituting some RAID groups may be offline due to disconnection of an enclosure cable of the drives, etc. In a further embodiment, if a system drive does not contain basic configuration information, corresponding RAID groups and LUNs may not be discovered and reported when offline drives reach a certain threshold such that a requirement of a RAID algorithm may not be satisfied. In a further embodiment, for users, they may lose these LUNs without any alerts. According to an embodiment, when basic configuration information cannot be obtained from a system drive, basic configuration information may be created from extended configuration information. In an example embodiment, if a fault occurs to a system drive, causing failure in reading basic configuration information, basic configuration information may be re-created from extended configuration information on a user drive. In another example embodiment, after a certain time (for example, 10 minutes) since a storage array is started, basic configuration information on a system drive may be scanned. In a further embodiment, if there are still RAID groups or LUNs that have not been discovered, an alert may be sent. In an embodiment, change of a storage array may include adding a new drive to a storage array.

According to an embodiment, step S203 may include the following steps. In one embodiment, firstly, drive information on a drive that is connected to the storage array may be identified. According to an embodiment, drive information may include at least one of initialization information or storage array information. In a further embodiment, initialization information may be used to determine whether a drive is initialized, and storage array information may be used to determine a storage array to which a drive belongs. In a further embodiment, when a type of drive is a user drive, based on drive information, it may be determined that a drive belongs to a storage array. In a further embodiment, next it may be determined whether extended configuration information on a drive matches basic configuration information on a system drive. In a further embodiment, in other words, it may be determined whether extended configuration information on a drive may be discovered in a basic configuration information on a system drive. In a further embodiment, subsequently, validity of a drive may be determined through extended configuration information on a drive and basic configuration information on a system drive, or through extended configuration information on a drive of a RAID group to which a drive belongs. In a further embodiment, since basic configuration information and extended configuration information may include the same validity information, validity of a drive may be determined by comparison of the two. In an additional embodiment, validity of a drive may also be examined through a plurality of mirrors on a user drive. In an example embodiment, if validity information on one user drive is different from validity information on other user drives in a same RAID group, a user drive may be considered to be invalid. In a further embodiment, finally, based on a creation policy, a new RAID group created or an existing RAID group may be updated according to extended configuration information on a drive.

According to an embodiment, based on extended configuration information on a drive, creating a new RAID group or updating a RAID group may include: when a storage array includes other drives of a RAID group to which a drive belongs, adding a drive to a RAID group. According to an embodiment, based on extended configuration information on a drive, creating a new RAID group or updating a RAID group may include: when a storage array does not include other user drives of a RAID group to which a drive belongs, creating a new RAID group.

According to an embodiment, the step S203 may include the following steps. In one embodiment, firstly, drive information on drive that is connected to the storage array may be identified. According to an embodiment, drive information may include at least one of initialization information and storage array information. In a further embodiment initialization information may be used to determine whether a drive is initialized, and storage array information may be used to determine a storage array to which a drive belongs. In a further embodiment, according to drive information, when a type of drive is a user drive, it may be determined that a drive does not belong to a storage array. In an embodiment, next, when there are at least two drives which do not belong to a storage array, a new RAID group may be created based on the at least two drives according to a basic configuration information and extended configuration information. In a further embodiment, during this process, whether to create a RAID group may be inquired of a user through interaction, such as a command line interface. In a further embodiment, if a user confirms, moves forward; otherwise, a drive may be used as a new drive or be defined by a user for other uses.

According to an embodiment, the step 203 may include the following steps. In an embodiment, firstly, drive information on a drive that is connected with the storage array may be identified. According to an embodiment, drive information may include at least one of initialization information and storage array information. In a further embodiment initialization information may be used to determine whether the drive is initialized, and storage array information may be used to determine a storage array to which a drive belongs. In a further embodiment, according to drive information, it may be determined that a drive is not initialized. In an embodiment, next, based on a creation policy, a new RAID group created or an existing RAID group may be updated on a drive.

According to an embodiment, a creation policy may include one of the following: creating a RAID group when all drives constituting a RAID group may be discovered; creating a RAID group when a number of the undiscovered drives in a RAID group may be less than or equal to a predetermined value; creating a RAID group when at least one drive in a RAID group may be discovered; and creating a RAID group after a predetermined time since one drive in a RAID group may be discovered.

According to an embodiment, method 200 may further include: creating or updating LUNs on a RAID group. In a further embodiment, this may be implemented using conventional methods, and whether creating or updating LUNs may be determined according to specific conditions, particularly whether a connected drive includes new configuration information and whether a user has new demands, etc. According to an embodiment, method 200 further includes: updating basic configuration information on a system drive, and storing updated basic configuration information onto a system drive; and updating extended configuration information on a RAID group, and storing updated extended configuration information to drives of a RAID group.

In one embodiment, it may be noted that a user may customize some situations without departing from principles of the present disclosure. In an example embodiment, types of drives for movement may further include types other than the aforementioned ones, such as an external drive not including configuration information, a drive of a storage array which includes configuration information does not match basic configuration information, and a drive of a storage array which does not include the configuration information, etc. In a further embodiment, regarding types, a user may process these drives as uninitialized drives, or process them in other reasonable manners. In a further embodiment, as for the aforementioned method, a user may intervene using a means like command line, etc., particularly when a method fails. In an example embodiment, when the aforementioned method cannot determine validity of a drive, a process may be performed through human intervention.

In the above embodiments, principles of the present disclosure may be illustrated in connection with a discovering process when a drive is to be connected with a storage array. In a further embodiment, it may be noted that for other configuration processes, operations according to the principle of the foregoing method may be performed. In an example embodiment, a discovering process of a drive during system booting may be substantially similar to a method described above, and therefore omitted herein.

Figure 3:
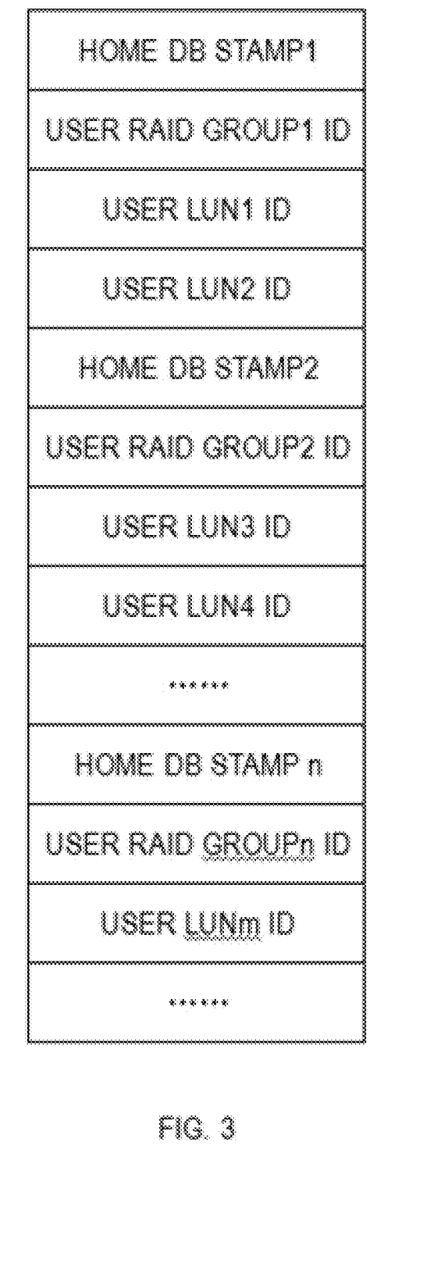
FIG. 3 schematically illustrates an architecture of basic configuration information according to an embodiment of the present disclosure.

FIG. 3 schematically illustrates an exemplary architecture of basic configuration information according to an embodiment of the present disclosure. The basic configuration information may include validity information, RAID group identifier information and LUN identifier information. As shown in FIG. 3, validity information may be implemented through a home database stamp, RAID group identifier information may be implemented through an ID of each user RAID group, and LUN identifier information may be implemented by a LUN ID. The basic configuration information may be stored in a database form in a specific area of each drive in the system drive, which may be for example a bare disk area. However, embodiments of the present disclosure are not limited to such storage, and any other appropriate storage may be feasible only if the principles of the present disclosure are implemented. According to the exemplary embodiment in FIG. 3, the basic configuration information may be stored in a home database form, and LUNs created on each RAID group correspond to RAID group and a home database stamp.

According to an embodiment, a home database stamp may be an 8 byte header. In a further embodiment, user RAID group and user LUN ID may be 4 bytes integer. In a further embodiment, home database may reside in a system drive using a 3-way mirror method. In an example embodiment, if a RAID group consists of 256 LUNs and there are 1,000 RAID groups in an array, the home database only occupies 1.5 MB. In a further embodiment, considering a storage array supporting 10,000 drives, the size of a home database may be about 20 MB. In a further embodiment, when all system drives are damaged, a home database may be created from a distributed database on a user drive.

Figure 4:
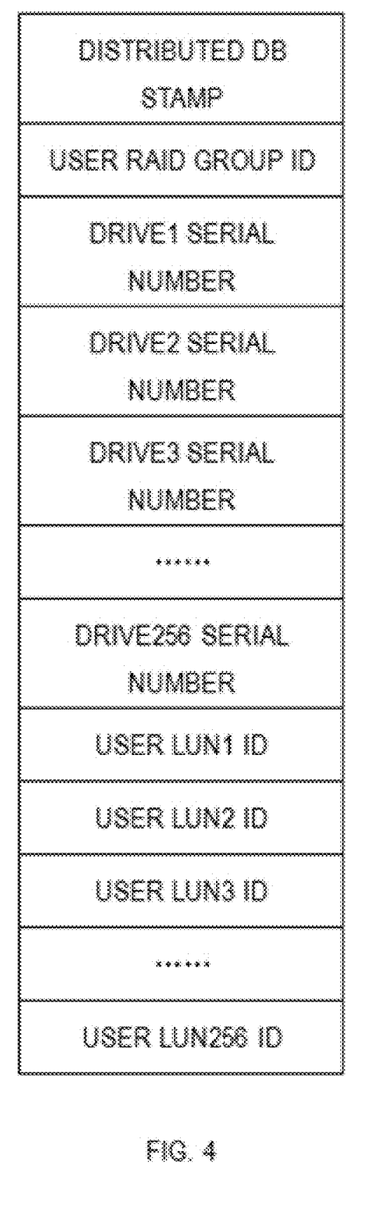
FIG. 4 schematically illustrates an architecture of extended configuration information according to an embodiment of the present disclosure.

FIG. 4 schematically illustrates an exemplary architecture of extended configuration information according to an embodiment of the present disclosure. As describe above, the extended configuration information includes validity information, RAID group identifier information, drive identifier information and LUN identifier information. As shown in FIG. 4, validity information is specifically implemented by the distributed database stamp, RAID group identifier information is implemented by the ID of the user RAID group, drive identifier information is implemented by the drive serial number, and LUN identifier information is implemented by the user LUN ID. A distributed database is self-organized in each RAID group and stored on the disks including the RAID group. For example, as shown in FIG. 3, a RAID group is built on 256 disks and consists of 256 LUNs. If one storage array comprises 1,000 such RAID groups, a distributed database of the extended configuration information occupies 11 MB on each drive. Hence, the distributed database does not take up much space. The validity information may be used to protect validity of configuration data on different drives. On typical example is that one drive is spared out of one RAID group. When the system is booted up, the information on this drive can be recognized to have stale data and could not be used to create the topology.

Figure 5:
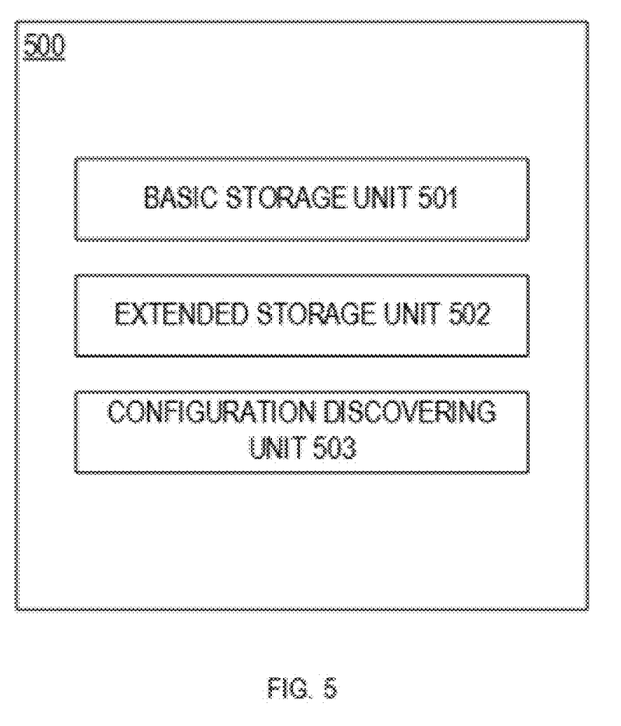
FIG. 5 is a block diagram schematically illustrating a device of managing storage array configuration according to an embodiment of the present disclosure.

FIG. 5 schematically illustrates a block diagram of a device 500 of managing storage array configuration according to an embodiment of the present disclosure. Device 500 comprises basic storage unit 501, extended storage unit 502 and configuration discovering unit 503. Basic storage unit 501 is configured to store the basic configuration information of a user drive to a system drive. Extended storage unit 502 is configured to store the extended configuration information of a user drive to the a drive. Moreover, configuration discovering unit 503 is configured to, in response to a change of the storage array, create a new RAID group or update a RAID group based on the basic configuration information and the extended configuration information.

According to an embodiment of the present disclosure, the basic configuration information includes: validity information; RAID group identifier information; and LUN information. According to an embodiment of the present disclosure, extended configuration information includes: validity information; RAID group identifier information; drive identifier information; and LUN identifier information. According to an embodiment of the present disclosure, extended storage unit may be further configured to store the extended configuration information onto a RAID group to which a user drive belongs, by using a N-way mirror method; wherein N is equal to a number of user drives included in a RAID group to which the user drive belongs.

According to an embodiment of the present disclosure, configuration discovering unit 503 is further configured to identify drive information on a drive that is connected to the storage array; according to drive information, determine that the drive belongs to a storage array when a type of the drive is a user drive; determine whether extended configuration information on a drive matches basic configuration information on a system drive; determine validity of a drive through extended configuration information on the drive and basic configuration information on a system drive, or through extended configuration information on a drive of a RAID group to which a drive belongs; and based on a creation policy, create a new RAID group or updating a RAID group according to extended configuration information on the drive.

According to an embodiment of the present disclosure, creating a new RAID group or updating a RAID group according to extended configuration information on a drive includes: when a storage array consists of other drives of a RAID group to which a drive belongs, adding a drive to a RAID group. According to an embodiment of the present disclosure, creating a new RAID group or updating a RAID group based on extended configuration information on a drive includes: when a storage array does not include other user drives of a RAID group to which a drive belongs, creating a new RAID group.

According to an embodiment of the present disclosure, configuration discovering unit 503 is further configured to identify drive information on a drive that is connected to a storage array; according to a drive information, determine that a drive does not belong to a storage array when a type of the drive is a user drive; and when there are at least two drives not belonging to a storage array, create a new RAID group based on at least two of the drives according to a basic configuration information and an extended configuration information.

According to an embodiment of the present disclosure, creating a new RAID group based on at least two of the user drives includes: determining validity of drives of the at least two drives which belong to a same RAID group, through extended configuration information of at least two drives; and based on a creation policy, creating a new RAID group according to extended configuration information on valid drives of at least two drives which belong to a same RAID group.

According to an embodiment of the present disclosure, configuration discovering unit 504 is further configured to: identify drive information on a drive that is connected to a storage array; determine that the drive is not initialized according to a drive information; and create a new RAID group or update a RAID group on the drive based on a creation policy.

According to an embodiment of the present disclosure, a creation policy may include one of the following: when all drives constituting a RAID group are discovered, creating a RAID group. A further embodiment may include when a number of undiscovered drives in a RAID group is less than or equal to a predetermined value, creating a RAID group. Yet a further embodiment may include when at least one drive in a RAID group is discovered, creating a RAID group. And yet a further embodiment may include after a predetermined time since one drive in a RAID group may be discovered, creating a RAID group. According to an embodiment of the present disclosure, drive information may include at least one of initialization information or storage array information.

According to an embodiment of the present disclosure, device 500 further includes: a logical-unit configuration unit configured to create or update a LUN on a RAID group. According to an embodiment of the present disclosure, device 500 further includes: a basic updating unit configured to update basic configuration information on a system drive, and store updated basic configuration information to a system drive; and an extended updating unit configured to update extended configuration information in a RAID group, and to store updated extended configuration information to drives of a RAID group.

It should be noted that, the embodiments of the present disclosure may be implemented by hardware, software or combination of software and hardware. The hardware portion may be achieved by dedicated logic; and the software portion may be stored in a memory and executed by a proper instruction executing system, such as a microprocessor or dedicated design hardware. It is appreciated by those skilled in the art that the aforementioned apparatus and method can be implemented by using computer executable instructions and/or by being included in processor control codes, for example providing such codes on a programmable memory or a data carrier such as an optical or electronic signal carrier.

Moreover, although figures illustrate operations of the method in the embodiments of the present disclosure in a particular sequence, this does not require or imply that these operations must be performed following the particular sequence, or desired result can be produced only if the demonstrated operations are all executed. To the contrary, the sequence of the steps depicted in the flow chart can be altered. Additionally or optionally, some steps may be skipped over, multiple steps may be combined as one step to be executed, and/or one step may be decomposed into multiple steps to be performed. It should be also noted that features and functions of two or more devices according to the embodiments of the present disclosure may be reflected in one device. Otherwise, features and functions of one device illustrated above may be further divided, which are embodied by a plurality of devices.

Although the present disclosure is illustrated with reference to several embodiments, it should be appreciated that the present disclosure is not limited to the disclosed embodiments. The embodiments of the present disclosure intend to cover various modifications and equivalent arrangements within the spirit and scope of the appended claims.

What is claimed is:

1. A method of managing storage array configuration, comprising:
   storing a basic configuration information of a user drive onto a system drive;
   storing an extended configuration information of the user drive onto the user drive;

in response to a change of the storage array, either
    creating a new disk array group or
    updating a disk array group according to the basic
        configuration information and the extended configuration information; and
further comprises either creating or updating a logical unit
    on the disk array group;
wherein an N-way mirroring is used for storing extended
    configuration information of the user drive onto the
    user drive,
wherein N is a number of user drives included in the disk
    array group belonging to the user drive.

2. The method according to claim 1, wherein the basic configuration information comprises:
    a validity information; a disk array group identifier information; and logical unit number identifier information.

3. The method according to claim 1, wherein the extended configuration information comprises:
    a validity information; a disk array group identifier information; a drive identifier information; and a logical unit number identifier information.

4. The method according to claim 1, wherein in response to a change of the storage array, either creating a new disk array group or updating a disk array group according to the basic configuration information and the extended configuration information further comprises:
    identifying a drive information on a drive connected to the storage array, wherein the drive information comprises at least one of an initialization information or a storage array information;
    according to the drive information, determining that the drive belongs to the storage array when the drive is a user drive;
    determining whether extended configuration information on the drive matches basic configuration information on the system drive;
    determining validity of the drive either
        through extended configuration information on the drive and the basic configuration information on the system drive, or
        through the extended configuration information on the drive of the disk array group to which the drive belongs; and
    performing at least one of:
        based on a creation policy, either creating a new disk array group or updating a disk array group according to extended configuration information on the drive, or
        when the storage array comprises other drives of the disk array group to which the drive belongs, adding the drive to the disk array group, or
        when the storage array does not comprise other drives of the disk array group to which the drive belongs, creating a new disk array group.

5. The method according to claim 1, wherein in response to a change of the storage array, either creating a new disk array group or updating a disk array group according to the basic configuration information and the extended configuration information further comprises:
    identifying drive information on a drive that is connected to the storage array;
    according to the drive information, determining that the drive does not belong to the storage array when the drive is a user drive; and
    when there are at least two drives not belonging to the storage array, creating a new disk array group based on the at least two drives according to the basic configuration information and the extended configuration information.

6. The method according to claim 5, wherein creating a new disk array group based on the at least two drives comprises:
    determining a validity of drives of the at least two user drives belonging to the same disk array group, through the extended configuration information of the at least two drives; and
    based on a creation policy, creating a new disk array group according to the extended configuration information on the valid drives of at least two drives belonging to the same disk array group.

7. The method according to claim 1, wherein in response to a change of the storage array, either creating a new disk array group or updating a disk array group according to the basic configuration information and the extended configuration information comprises:
    identifying the drive information on a drive that is connected to the storage array;
    determining that the drive is not initialized according to the drive information; and
    creating a new disk array group or updating a disk array group on the drive based on a creation policy.

8. The method according to claim 1, wherein the creation policy comprises at least one:
    when all the drives constituting a disk array group are discovered, creating the disk array group;
    when a number of undiscovered drives in the disk array group is less than or equal to a predetermined value, creating the disk array group;
    when at least one drive in the disk array group is discovered, creating the disk array group; and
    after a predetermined time of one drive in the disk array group being discovered, creating a disk array group.

9. The method according to claim 1, further comprising:
    updating the basic configuration information on the system drive, and storing the updated basic configuration information to the system drive; and
    updating the extended configuration information on the disk array group, and storing the updated extended configuration information to the drives of the disk array group.

10. A device for managing storage array configuration, the device configured for:
    storing a basic configuration information of a user drive onto a system drive;
    storing an extended configuration information of the user drive onto the user drive;
    in response to a change of the storage array, either
        creating a new disk array group or
        updating a disk array group according to the basic configuration information and the extended configuration information; and
    further comprises either creating or updating a logical unit on the disk array group;
    wherein an N-way mirroring is used for storing extended configuration information of the user drive onto the user drive,
    wherein N is a number of user drives included in the disk array group belonging to the user drive.

11. The device according to claim 10, wherein the basic configuration information comprises:
    a validity information; a disk array group identifier information; and a logical unit number identifier information.

12. The device according to claim 10, wherein the extended configuration information comprises:
a validity information; a disk array group identifier information; a drive identifier information; and a logical unit number identifier information.

13. The device according to claim 10, wherein in response to a change of the storage array, either creating a new disk array group or updating a disk array group according to the basic configuration information and the extended configuration information further comprises:
identifying a drive information on a drive connected to the storage array, wherein the drive information comprises at least one of an initialization information or a storage array information;
according to the drive information, determining that the drive belongs to the storage array when the drive is a user drive;
determining whether extended configuration information on the drive matches basic configuration information on the system drive;
determining validity of the drive either
through extended configuration information on the drive and the basic configuration information on the system drive or
through the extended configuration information on the drive of the disk array group to which the drive belongs; and
performing at least one of:
based on a creation policy, either creating a new disk array group or updating a disk array group according to extended configuration information on the drive or
when the storage array comprises other drives of the disk array group to which the drive belongs, adding the drive to the disk array group or
when the storage array does not comprise other drives of the disk array group to which the drive belongs, creating a new disk array group.

14. The device according to claim 10, wherein in response to a change of the storage array, either creating a new disk array group or updating a disk array group according to the basic configuration information and the extended configuration information further comprises:
identifying drive information on a drive that is connected to the storage array;
according to the drive information, determining that the drive does not belong to the storage array when the drive is a user drive; and
when there are at least two drives not belonging to the storage array, creating a new disk array group based on the at least two drives according to the basic configuration information and the extended configuration information.

15. The device according to claim 14, wherein creating a new disk array group based on the at least two drives comprises:
determining a validity of drives of the at least two user drives belonging to the same disk array group, through the extended configuration information of the at least two drives; and
based on a creation policy, creating a new disk array group according to the extended configuration information on the valid drives of at least two drives belonging to the same disk array group.

16. The device according to claim 10, wherein in response to a change of the storage array, either creating a new disk array group or updating a disk array group according to the basic configuration information and the extended configuration information comprises:
identifying the drive information on a drive that is connected to the storage array;
determining that the drive is not initialized according to the drive information; and
creating a new disk array group or updating a disk array group on the drive based on a creation policy.

17. The device according to claim 10, wherein the creation policy comprises at least one:
when all the drives constituting a disk array group are discovered, creating the disk array group;
when a number of undiscovered drives in the disk array group is less than or equal to a predetermined value, creating the disk array group;
when at least one drive in the disk array group is discovered, creating the disk array group; and
after a predetermined time of one drive in the disk array group being discovered, creating a disk array group.

18. The device according to claim 10, further comprising:
updating the basic configuration information on the system drive, and storing the updated basic configuration information to the system drive; and
updating the extended configuration information on the disk array group, and storing the updated extended configuration information to the drives of the disk array group.

* * * * *